United States Patent
Wierzbicki et al.

[11] Patent Number: 6,014,009
[45] Date of Patent: Jan. 11, 2000

[54] ELECTRONIC DEVICE

[75] Inventors: Robert P. Wierzbicki, Worcester; Paul Whitcher, Hoptkinton, both of Mass.

[73] Assignee: Data General Corporation, Westboro, Mass.

[21] Appl. No.: 08/959,021

[22] Filed: Oct. 28, 1997

Related U.S. Application Data

[63] Continuation of application No. 08/846,244, Apr. 25, 1997, abandoned.

[51] Int. Cl.$^7$ ............................... H02J 7/00; H01M 2/10
[52] U.S. Cl. ......................... 320/107; 320/106; 320/114; 429/98; 429/99
[58] Field of Search ..................... 320/106, 107, 320/112, 113, 114; 429/98, 99, 100, 9

[56] References Cited

U.S. PATENT DOCUMENTS

| | | | |
|---|---|---|---|
| 5,015,546 | 5/1991 | Dulaney et al. | 429/99 |
| 5,172,043 | 12/1992 | Toops | 320/106 |
| 5,212,020 | 5/1993 | Inobe | 429/9 |
| 5,436,088 | 7/1995 | Castaneda et al. | 429/96 |
| 5,626,979 | 5/1997 | Misui et al. | 429/97 |
| 5,652,496 | 7/1997 | Pilarzyk et al. | 320/106 |
| 5,909,101 | 6/1999 | Matsumoto et al. | 320/110 |

OTHER PUBLICATIONS

Duracell Inc., Duracell Nickel Mettal Hydride Rechargeable Battery—DR121 Size 4xAA, Apr. 1996.

*Primary Examiner*—Peter S. Wong
*Assistant Examiner*—Gregory J. Toatley, Jr.
*Attorney, Agent, or Firm*—Kriegsman & Kriegsman

[57] ABSTRACT

An electronic device supplied power from either a single rechargeable battery or four non-rechargeable batteries. The single rechargeable battery is preferably a 4.8 volt, DURA-CELL DR-121 rechargeable battery which includes a first end having positive and negative terminal contacts, a pair of recharging contacts and a key. Each of the four non-rechargeable batteries are preferably AA size, lithium batteries and are configured so that a first pair of batteries in series are in parallel with a second pair of batteries in series. The electronic device comprises a housing shaped to include a battery cavity which can accept either type of battery source. The battery cavity comprises a bottom wall, a front end wall, a back end wall and a pair of sidewalls. One of the sidewalls includes a slot which is sized and shaped to accept the key of the rechargeable battery, the slot enabling the rechargeable battery to be inserted in the battery cavity only in its proper orientation relative to the battery cavity. The electronic device also includes an electronic circuit within the housing for enabling the electronic device to perform a particular operation, the electronic circuit receiving power from the battery source by a battery circuit. The electronic device further comprises a pair of spring contacts on the front end wall, a pair of looped wire contacts mounted on the back end wall, a plurality of a plurality of flexible fingers formed in the sidewalls and plurality of flexible tabs formed on the bottom wall which all serve to maintain either battery source in an operative electrical contact position within the battery cavity.

15 Claims, 9 Drawing Sheets

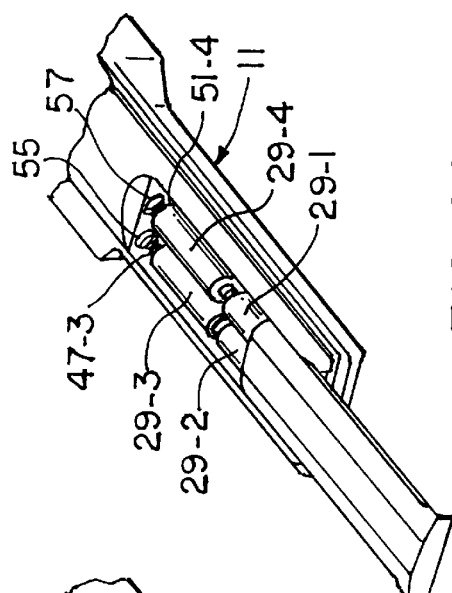
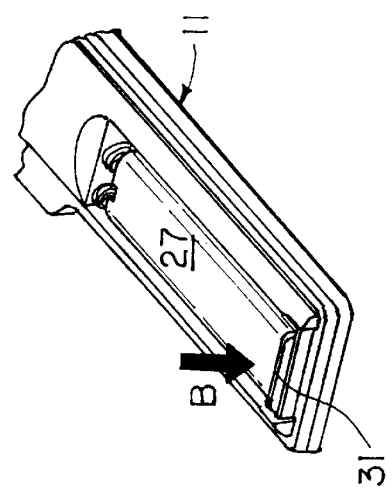
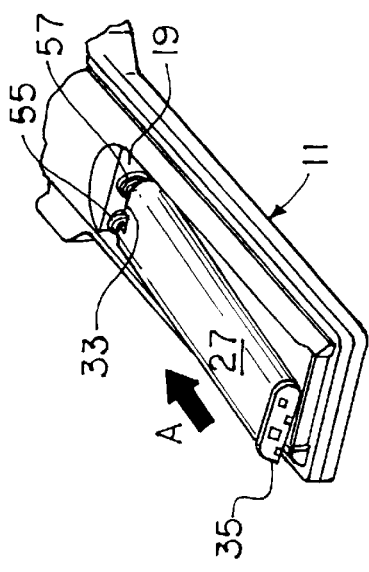
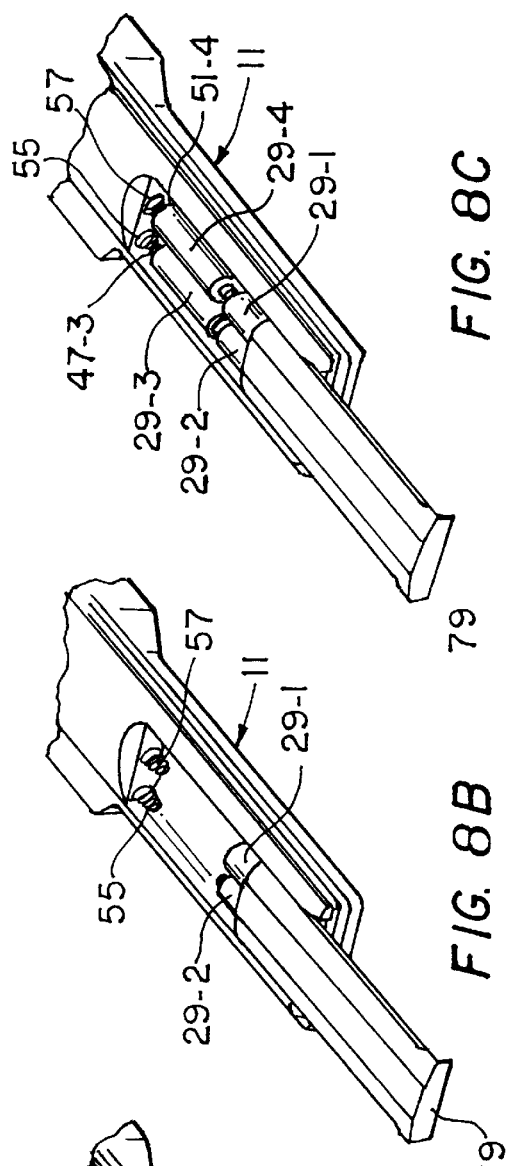
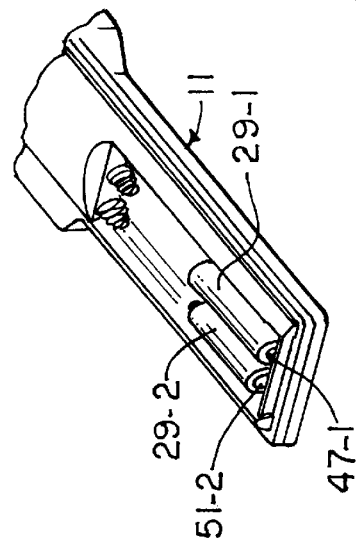

ELECTRONIC DEVICE

CROSS-REFERENCE TO RELATED APPLICATIONS

This application is a continuation of U.S. patent application Ser. No. 08/846,244 which was filed on Apr. 25, 1997 now abandoned in the name of Robert P. Wierzbicki.

BACKGROUND OF THE INVENTION

The present invention relates generally to electronic devices and more particularly to portable, battery operated electronic devices.

Electronic devices, such as radios, tape recorders and computers very often derive power from a battery source which is removably mounted within the housing of the device so as to enable the device to be handheld during use. Conventionally, two or more primary batteries, such as carbon-zinc, alkaline or lithium batteries, are arranged in series within the housing to provide the power necessary to operate the electronic device.

One drawback of electronic devices that utilize primary batteries is that the consumer is forced to continually replace the used-up primary batteries with new batteries because the primary batteries are not designed for recharging, thereby increasing the overall cost to operate the device.

Electronic devices which utilize rechargeable batteries instead of non-rechargeable batteries are well known in the art and are commonly used to provide the power necessary to operate electronic devices. Rechargeable batteries, such as nickel-cadmium and nickel metal hydride batteries, can be repeatedly recharged and reused for a significant number of charge/discharge cycles.

One drawback of electronic devices that utilize rechargeable batteries is that the consumer is required to periodically recharge the rechargeable battery, the recharging process often taking a considerable amount of time to complete. During the time in which the rechargeable battery is being recharged, the consumer is unable to operate the device, thereby limiting the range of potential uses.

As a result, it is known in the art for electronic devices to include a housing which is able to accept a rechargeable battery to supply power to the device but which also is able to accept primary non-rechargeable batteries to supply power to the device in those instances when the rechargeable battery is being recharged.

In U.S. Pat. No. 5,153,495 to Connors, there is disclosed a convertible battery handle in which an extended end cap contains a drive spring electrically insulated from the battery circuits to physically hold the rechargeable battery cells in proper position and a coaxial helical spring electrically connected into the battery circuit. The helical spring has a length insufficient to make electrical contact when the handle is utilized with a rechargeable battery pack, but when a pair of non-rechargeable dry cells are positioned in the handle the electrical circuit is completed through the spring. A safety diode is placed in the series with the electrical circuit for the non-rechargeable cells to prevent inadvertent charging of the cells.

Electronic devices which are adapted so as to be able to receive power from either rechargeable or non-rechargeable batteries typically configure the non-rechargeable batteries in a series connection within the housing of the electronic device. With the non-rechargeable batteries connected in series, the output voltage of the batteries is limited to the sum of the voltages of each individual battery, and the circuit current remains constant through each battery.

One drawback of an electronic device which derives power from a power source comprising two or more non-rechargeable batteries that are arranged in series is that the power output of the battery source is limited by the internal resistance of each battery. More specifically, the current capability of the electronic device is limited to the internal resistance of the weakest battery in the power source. As a consequence, it has been often found that the current capacity of the power supply is insufficient to drive higher power loads, such as handheld computers.

Various models of high power load handheld computers are sold by Data General Corporation of Westboro, Massachusetts under the name DATAGENIE. These types of handheld computers are designed for application-specific data collection, such as keeping records of inventory in the workplace. These handheld computers typically include a wireless spread-spectrum radio which is integrated with a laser scanner which requires a high power load.

High power loads such as handheld computers require that if a plurality of primary batteries are used to power the electronic device, the primary batteries need to be connected in parallel. Configured as such, the current capacity of the circuit is dramatically increased. As a consequence, the increased current capacity increases the total power output of the circuit, thereby enabling the power source to drive higher power loads.

It is an object of this invention to provide a new and improved electronic device.

It is another object of this invention to provide an electronic device as described above which comprises a housing shaped to include a battery cavity which is sized and shaped to accept either a rechargeable battery or a plurality of non-rechargeable batteries as a battery source for supplying power to the electronic device.

It is yet another object of this invention to provide an electronic device as described above which further includes a battery circuit for supplying the power provided from the battery source to an electronic circuit in the device.

It is still another object of this invention to provide an electronic device as described above wherein the battery circuit configures at least TWO of the plurality of non-rechargeable batteries in parallel.

SUMMARY OF THE INVENTION

An electronic device which is supplied power from a battery source, the battery source being either a rechargeable battery or a plurality of non-rechargeable batteries, the rechargeable battery having a first end and a second end, the first end having a positive terminal contact, a negative terminal contact, a pair of recharging contacts and a key, each of the plurality of non-rechargeable batteries including a first end having a positive terminal contact and a second end having a negative terminal contact, said electronic device comprising a housing shaped to include a battery cavity which can accept either the rechargeable battery or the plurality of non-rechargeable batteries as the battery source for said electronic device, the battery cavity comprising a bottom wall, a front end wall, a back end wall and a pair of sidewalls, one of the sidewalls of said battery cavity having a slot, said slot being sized and shaped to accept the key of the rechargeable battery to enable said battery cavity to accept the rechargeable battery as the battery source for said electronic device only when said rechargeable battery is inserted in said battery cavity in its proper orientation relative to said battery cavity, an electronic circuit within said housing for enabling said electronic device to perform a particular operation, and a battery circuit within said housing for supplying power from the battery source in said battery cavity to said electronic circuit.

Various other features and advantages will appear from the description to follow. In the description, reference is made to the accompanying drawings which form a part thereof, and in which is shown by way of illustration, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts:

FIG. 7A is a bottom perspective view, broken away in part, of the electronic device of FIG. 1A during one step in the procedure for installing the rechargeable battery into the battery cavity of the electronic device, the electronic device being shown with the cover removed;

FIG. 7B is a bottom perspective view, broken away in part, of the electronic device of FIG. 1A during another step in the procedure for installing the rechargeable battery into the battery cavity of the electronic device, the electronic device being shown with the cover removed;

FIG. 8A is a bottom perspective view, broken away in part, of the electronic device of FIG. 1A during one step in the procedure for installing the plurality of non-rechargeable batteries into the battery cavity of the electronic device, the electronic device being shown with the cover removed;

FIG. 8B is a bottom perspective view, broken away in part, of the electronic device of FIG. 1A during another step in the procedure for installing the plurality of non-rechargeable batteries into the battery cavity of the electronic device, the electronic device being shown with the cover partially mounted thereon;

FIG. 8C is a bottom perspective view, broken away in part, of the electronic device of FIG. 1A, the device being shown with the plurality of non-rechargeable batteries properly installed and with the cover partially mounted thereon;

DETAILED DESCRIPTION OF THE PREFERRED EMBODIMENT

Figure 1A:
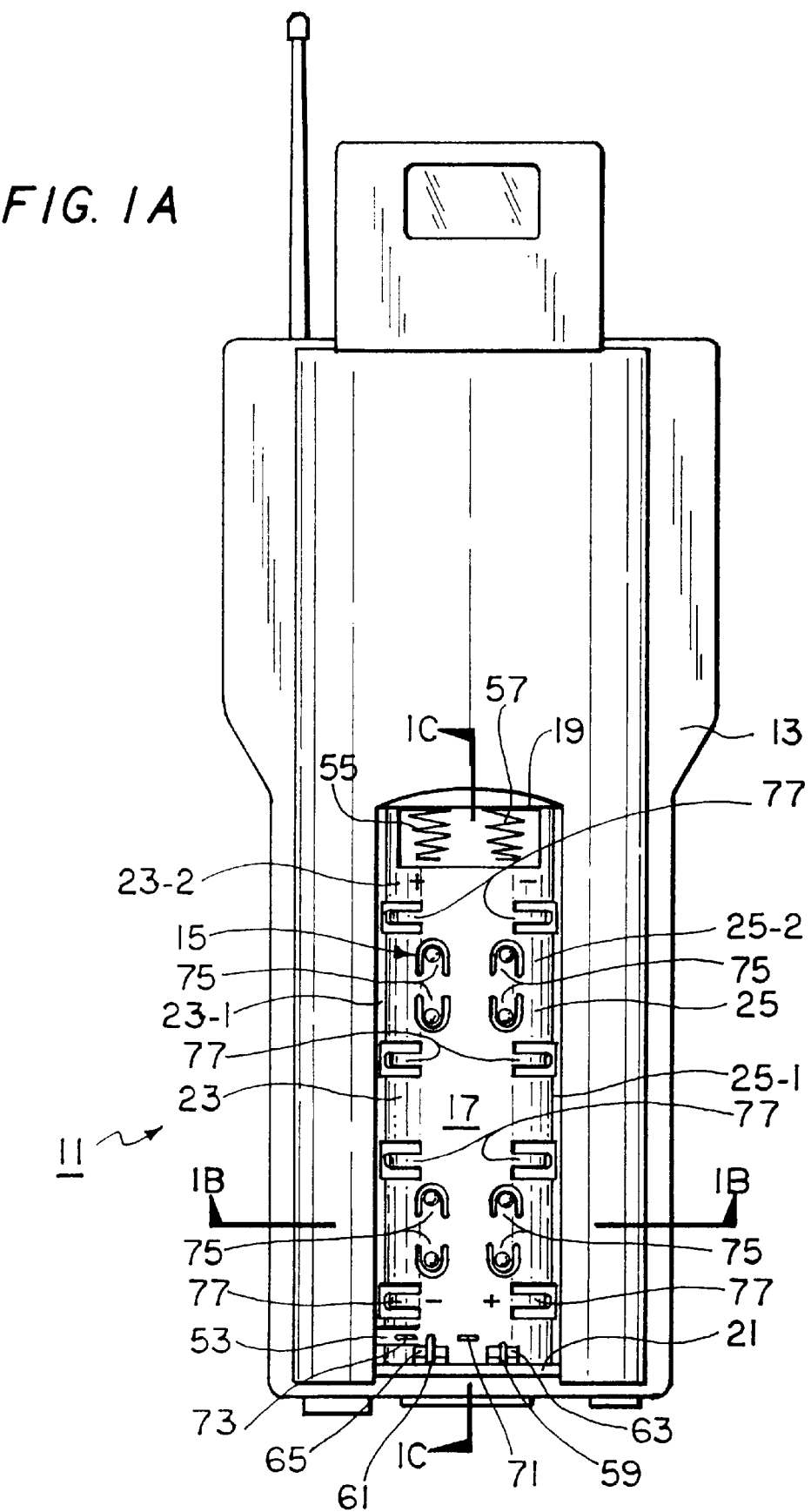
FIG. 1A is a bottom plan view of an electronic device constructed according to the teachings of the present invention, the electronic device being shown with the cover removed.
Figure 1B:
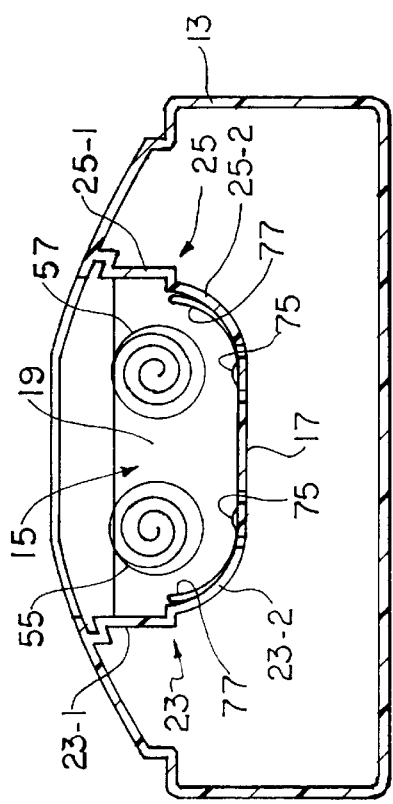
FIG. 1B is a cross-sectional view of the electronic device of FIG. 1A taken along lines 1B—1B.
Figure 1C:
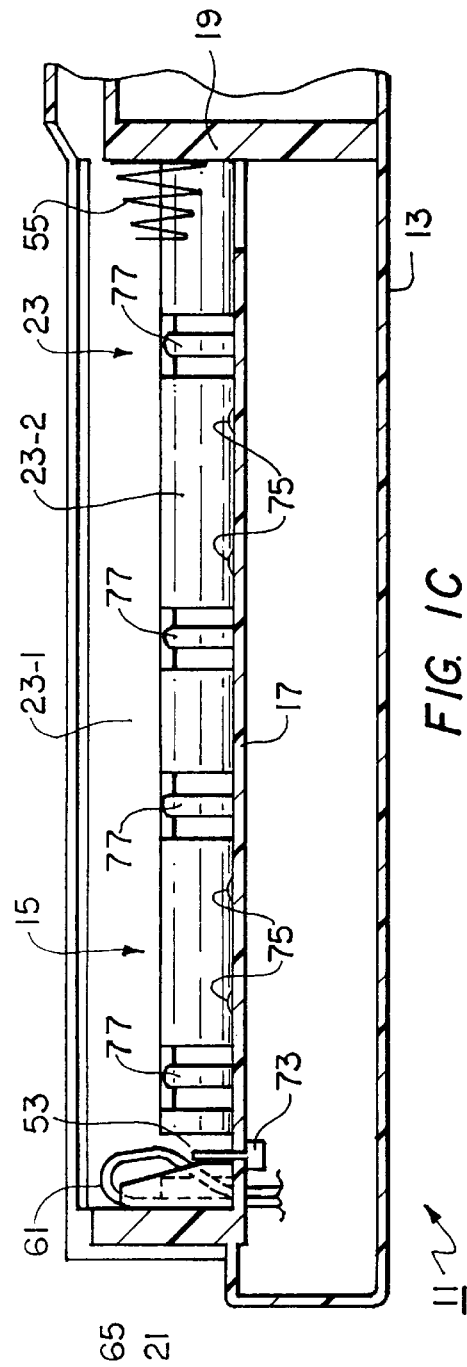
FIG. 1C is a cross-sectional view of the electronic device of FIG. 1A taken along lines 1C—1C.
Figure 2:
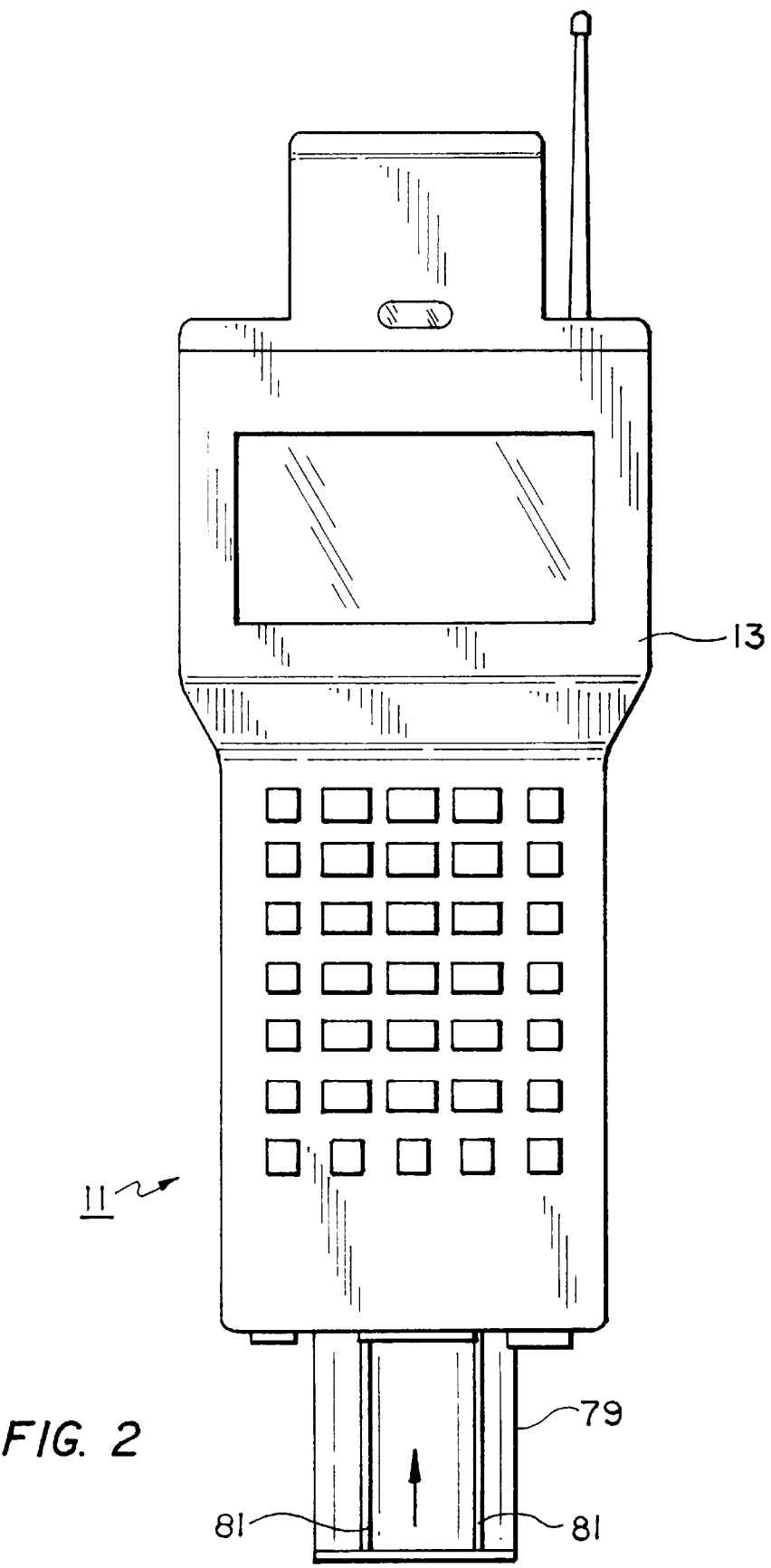
FIG. 2 is a top plan view of the electronic device of Fig. 1A, the cover being shown partially mounted thereon.

Referring now to the drawings, there are shown in FIGS. 1A and 2, bottom and top plan views, respectively, of an electronic device constructed according to the teachings of the present invention, the electronic device being identified by reference numeral 11.

Electronic device 11 is shown as a handheld computer which can be used for data collection tasks. Preferably, electronic device 11 is a DATAGENIE handheld computer manufactured for sale by Data General Corporation of Westboro, Massachusetts. However, it is to be understood that electronic device 11 is not limited to handheld computers but rather could be any electronic device which is supplied power from a battery source.

Electronic device 11 comprises a housing 13 which is constructed out of a rigid and durable material such as plastic. Housing 13 is shaped to include a battery cavity 15.

Battery cavity 15 comprises a bottom wall 17, a front end wall 19, a back end wall 21, a left sidewall 23 and a right sidewall 25. Left sidewall 23 is shaped to include a flat upper wall portion 23-1 and an arcuate lower wall portion 23-2. Similarly, right sidewall 25 is shaped to include a flat upper wall portion 25-1 and an arcuate lower wall portion 25-2.

As will be described in detail below, battery cavity 15 is sized and shaped to accept either a single rechargeable battery 27 or four non-rechargeable batteries 29 as a battery source for electronic device 11.

Figure 3:
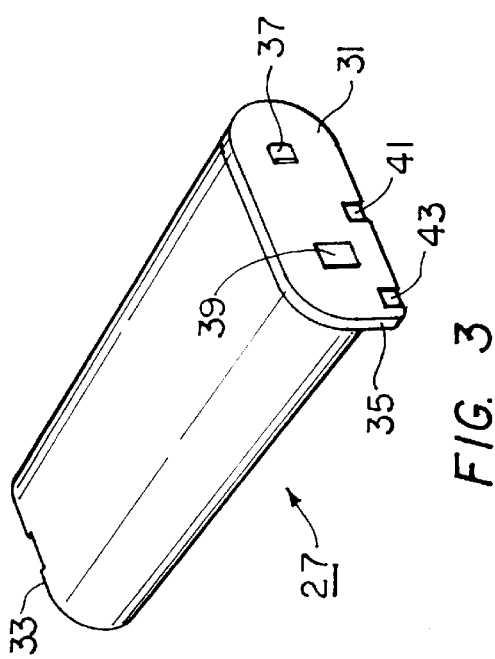
FIG. 3 is a front perspective view of the rechargeable battery which serves as one type of battery source for the electronic device of FIG. 1A.
Figure 4:
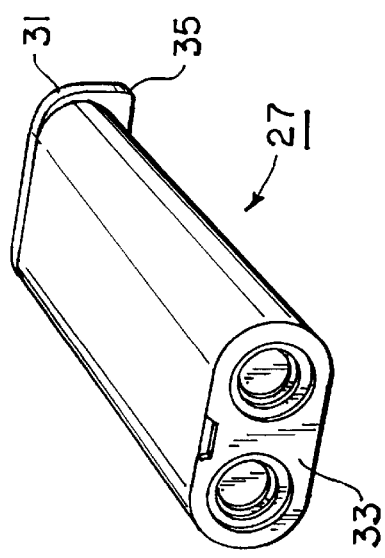
FIG. 4 is a rear perspective view of the rechargeable battery of FIG. 3.

Referring to FIGS. 3 and 4, single rechargeable battery 27 is preferably a 4.8 volt, nickel metal hydride (NiMH) rechargeable battery of the type sold by DURACELL INC. as model DR-121. Rechargeable battery 27 is generally cylindrical in shape and includes a first end 31 and a second end 33. First end 31 is shaped to include a pointed key 35 which protrudes out therefrom. First end 31 also includes a positive terminal contact 37, a negative terminal contact 39, a first recharging contact 41 and a second recharging contact 43. It should be noted that positive terminal contact 37 protrudes out from first end 31 whereas negative terminal contact 39 and recharging contacts 41 and 43 are all recessed within first end 31. It should also be noted that second end 33 of rechargeable battery 27 does not include any electrical contacts.

Figure 5:
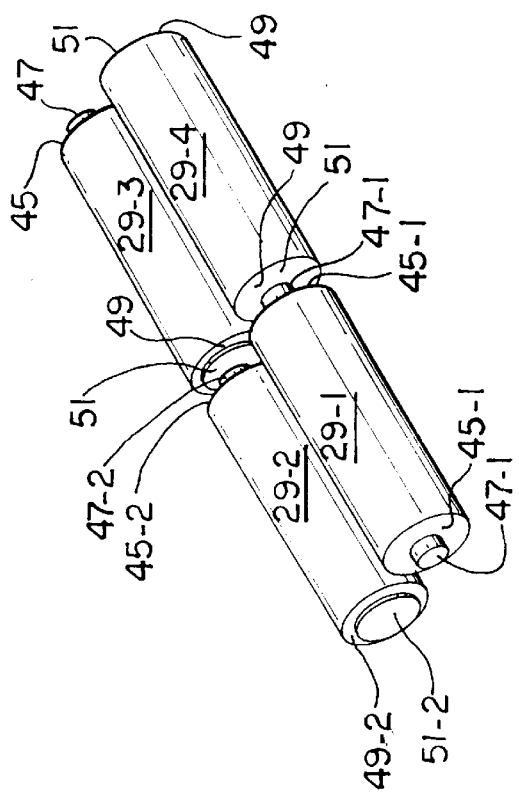
FIG. 5 is a front perspective view of the four non-rechargeable batteries which together serve as one type of battery source for the electronic device of FIG. 1A.
Figure 6:
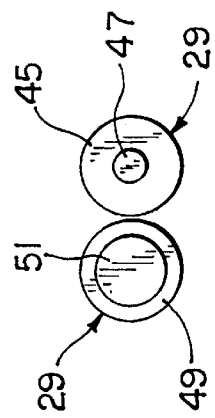
FIG. 6 is a rear plan view of the non-rechargeable batteries of FIG. 5.

As shown in detail in FIGS. 5 and 6, each of the four non-rechargeable batteries 29 is preferably an ENERGIZER Hi-energy, size AA, lithium battery. Each of non-rechargeable batteries 29 is generally cylindrical in shape and includes a first end 45 having a protruding positive terminal contact 47 and a second end 49 having a flat negative terminal contact 51.

It should be noted that although battery cavity 15 is sized and shaped to accept either single rechargeable battery 27 or four non-rechargeable batteries 29, the two different battery sources are not identical in either size or shape. Rather, with four non-rechargeable batteries 29 arranged in the manner for installation in battery cavity 15 as shown in FIG. 5, with two parallel columns of two batteries, the overall size and shape of single rechargeable battery 27 is slightly larger than the overall size and shape of four non-rechargeable batteries 29. Due to the variance in size and shape, electronic device 11 is specifically designed so as to enable battery cavity 15 to accommodate either battery source in an operative electrical contact position, as will be described in detail below.

Housing 13 is shaped to include a slot 53 formed into arcuate lower wall portion 23-2 of left sidewall 23 in close proximity to back end wall 21. Slot 53 is formed as a generally right angle slot in arcuate lower wall portion 23-2 at the intersection of left sidewall 23 and bottom wall 17. Slot 53 is sized and shaped to accept pointed key 35 of rechargeable battery 27 and thereby enable rechargeable battery 27 to be accepted entirely within battery cavity 15 in only its proper position and orientation. Because slot 53 enables rechargeable battery to be accepted entirely within battery cavity 15 in only its proper position and orientation, the dangers associated with improperly loading rechargeable battery 27 in battery cavity 15 are eliminated.

Electronic device 11 also comprises first and second coiled spring contacts 55 and 57 which are mounted on front end wall 19 of battery cavity 15. First and second spring contacts 55 and 57 are sized and shaped and have a sufficient elasticity and spring force so as to maintain either single rechargeable battery, 27 or four non-rechargeable batteries 29 in an operative electrical contact position within battery cavity 15.

Electronic device 11 further comprises first and second wire contacts 59 and 61 which are mounted on back end wall 21 of battery cavity 15. First and second wire contacts 59 and 61 are each bent to form a rigid looped contact, second wire contact 61 forming a looped contact which projects further into cavity 15 from back end wall 21 than first wire contact 59. Second wire contact 61 projects further into cavity 15 than first wire contact 59 at a distance that enables either rechargeable battery 27 or non-rechargeable batteries 29 to be in an operative electrical contact position within battery cavity 15. In particular, with rechargeable battery 27 positioned within cavity 15, first and second contacts 59 and 61 are sized and shaped relative to one another so that second wire contact 61 is in operative electrical contact with recessed negative terminal contact 39 at the same time that first wire contact 59 is in operative electrical contact with protruding positive terminal contact 37.

First and second wire contacts 59 and 61 are held supported on back end wall 21 by first and second support ramps 63 and 65, respectively. First support ramp 63 includes an elongated longitudinal slot (not shown) through which first wire contact 59 projects and second support ramp 65 includes an elongated slot (not shown) through which second wire contact 61 projects. Support ramps 63 and 65 serve to support first and second wire contacts 59 and 61, respectively, so as to maintain either rechargeable battery 27 or non-rechargeable batteries 29 securely within battery cavity 15 and in operative electrical contact position. Support ramps 63 and 65 are made of an insulative material, such as plastic, and are angled down and into battery cavity 15 so as to facilitate the loading of either battery source.

Electronic device 11 further comprises first and second recharging contacts 71 and 73. Contacts 71 and 73 are small rectangular contacts which are made of a conductive material. Contacts 71 and 73 project up perpendicularly from bottom wall 17 in close proximity to back end wall 21. Specifically, first recharging contact 71 projects up from bottom wall 17 between first and second wire contacts 59 and 61. Second recharging contact 73 projects up from bottom wall 17 in slot 53.

First and second recharging contacts 71 and 73 are positioned so that with rechargeable battery 27 properly loaded within battery cavity 15, first and second contacts 71 and 73 are in direct operative electrical contact with first and second recharging contacts 41 and 43, respectively. Furthermore, with four non-rechargeable batteries 29 properly loaded within battery cavity 15, first and second rechargeable contacts 71 and 73 are positioned so as to avoid drawing operative electrical contact with any part of non-rechargeable batteries 29, thereby eliminating the dangers associated with attempting to recharge non-rechargeable batteries.

Figure 8D:
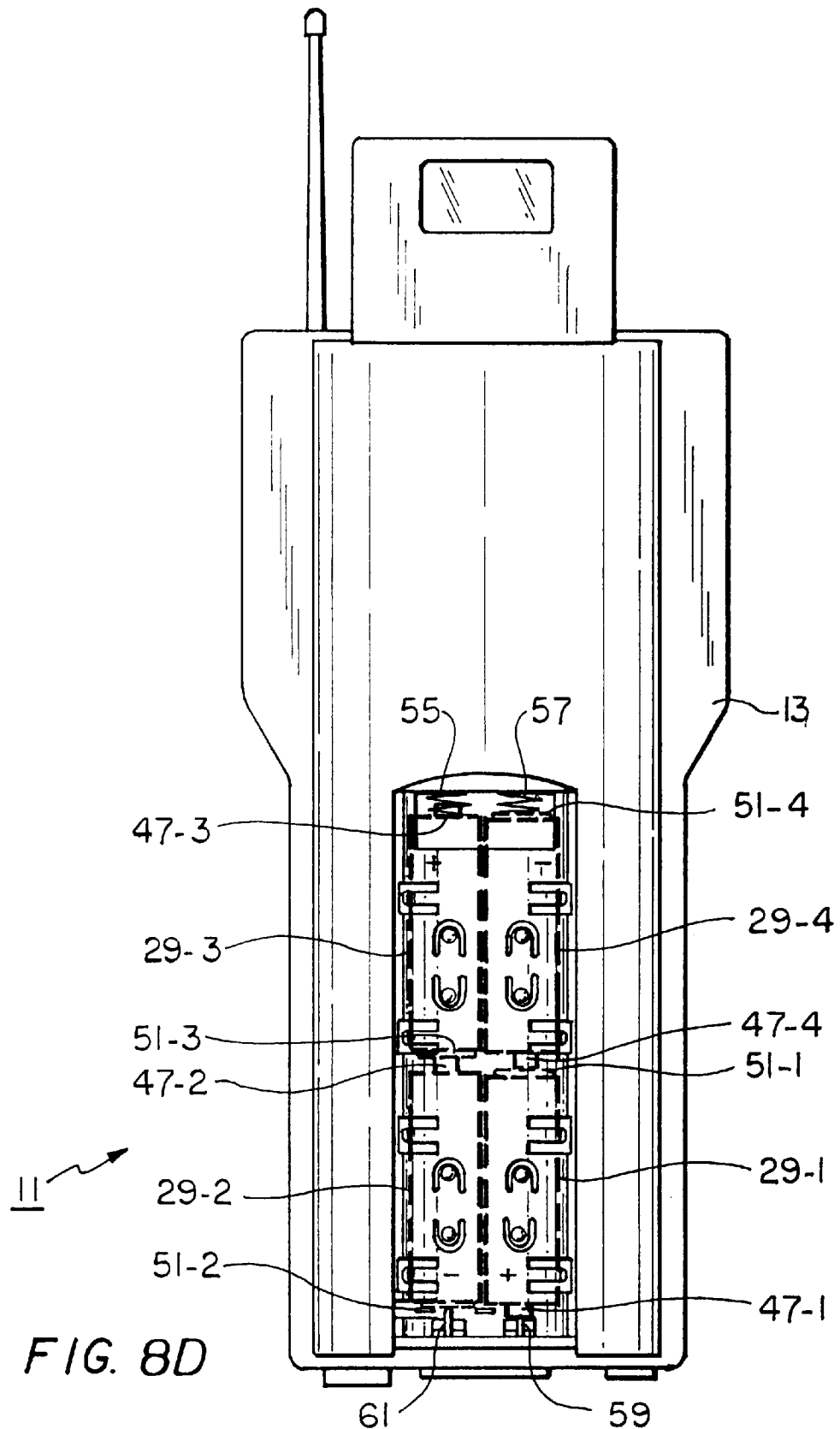
FIG. 8D is a bottom plan view of the electronic device of FIG. 1A, the electronic device being shown with the cover removed and with the plurality of non-rechargeable batteries properly installed, the non-rechargeable batteries being shown in phantom.

Housing 13 also includes eight flexible tabs 75 which are Formed in bottom wall 17 of battery cavity 15. Flexible tabs 75 are arranged in bottom wall 17 so that two flexible tabs 75 are positioned underneath each one of the four non-rechargeable batteries 29 when loaded into battery cavity 17, as shown in FIG. 8D. Flexible tabs 75 are capable of flexing down through bottom wall 17 in order to position either rechargeable battery 27 or non-rechargeable batteries 29 at the proper height relative to bottom wall 17 in order to maintain batteries 27 and 29 in operative electrical contact position with spring contacts 55 and 57 and wire contacts 59 and 61.

Housing 13 also includes eight flexible fingers 77 which are formed in sidewalls 23 and 25 of battery cavity 15. Flexible fingers 77 are arranged in sidewalls 23 and 25 so that two flexible fingers 77 are positioned directly against each one of the four non-rechargeable batteries 29 when loaded into battery cavity 17, as shown in FIG. 8D. Flexible fingers 75 are capable of flexing out through sidewalls 23 and 25 so as to position either rechargeable battery 27 or non-rechargeable batteries 29 at the proper position relative to sidewalls 23 and 25 in order to maintain batteries 27 and 29 in operative electrical contact position with spring contacts 55 and 57 and wire contacts 59 and 61.

Electronic device includes a cover 79 which is slidably mountable over battery cavity 15. Cover 79 includes a pair of elongated ribs 81. With battery 27 or batteries 29 loaded into battery cavity 15, cover 79 can be slidably mounted over battery cavity 15 such that ribs 81 to place a downward force that positions battery 27 or batteries 29 at the proper height relative to bottom wall 17 in order to maintain batteries 27 and 29 in operative electrical contact position with spring contacts 55 and 57 and wire contacts 59 and 61.

Figure 7C:
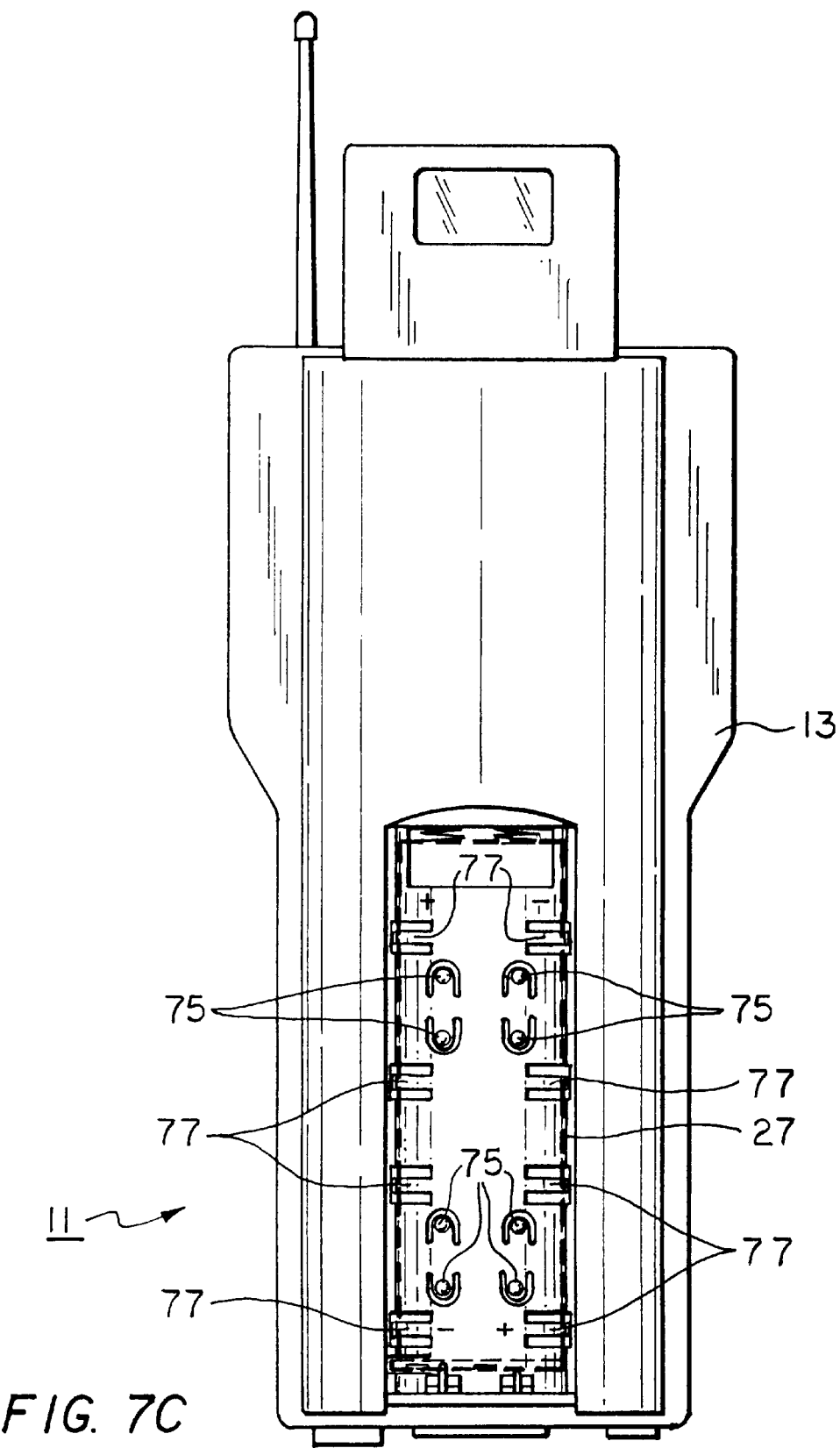
FIG. 7C is a bottom plan view of the electronic device of FIG. 1A, the electronic device being shown with the cover removed and with the rechargeable battery properly installed, the rechargeable battery being shown in phantom.

In use, rechargeable battery 27 is installed within housing 13 of electronic device 11 in the following manner. Referring to FIGS. 7A, 7B and 7C, with pointed key 35 facing down towards bottom wall 17, second end 33 of rechargeable battery 27 is positioned into contact with spring contacts 55 and 57. Second end 33 of battery 27 is then pushed in towards front end wall 19 in the direction as shown by arrow A in FIG. 7A, the forwards force of battery 27 causing spring contacts 55 and 57 to compress. With spring contacts 55 and 57 still compressed, first end 31 of battery 27 is pushed down towards bottom wall 17 in the direction shown by arrow B in FIG. 7B until battery 27 is locked into position within battery cavity 15, with pointed key 35 positioned within slot 53.

It should be noted that with rechargeable battery 27 properly positioned in battery cavity 15 as shown in FIG. 7C, tabs 75 and fingers 77 flex slightly to accommodate rechargeable battery 27. Furthermore, with rechargeable battery 27 properly positioned as such, positive terminal contact 37 is in operative electrical contact with first wire contact 59, negative terminal contact 39 is in operative electrical contact with second wire contact 61, first recharging contact 41 is in operative electrical contact with first recharging contact 71 and second recharging contact 43 is operative electrical contact with second recharging contact 73.

In use, four non-rechargeable batteries 29 are installed within housing 13 in the following manner. Referring to FIG. 8A, a first non-rechargeable battery 29-1 is positioned within cavity 15 so that its protruding positive terminal contact 47-1 is in operative electrical contact with first wire contact 59 and a second non-rechargeable battery 29-2 is positioned within cavity 15 so that its flat negative terminal contact 51-2 is in operative electrical contact with second wire contact 61. As shown in FIG. 8B, cover 79 is slidably mounted over a portion of cavity 15, cover 79 being positioned directly over installed batteries 29-1 and 29-2. As shown in FIGS. 8C and 8D, a third non-rechargeable battery 29-3 is positioned within cavity 15 so that its protruding positive terminal contact 47-3 is in operative electrical contact with first spring contact 55 and a fourth non-rechargeable battery 29-4 s positioned within cavity 15 so that its flat negative terminal contact 51-4 is in operative electrical contact with second spring contact 57. Cover 79 is then fully closed.

As shown above, battery cavity 15 can accommodate either single rechargeable battery 27 or four non-rechargeable batteries 29 as the battery source for device 11. Regardless of the type of battery source installed within battery cavity 15, the battery source supplies power to an electronic circuit EC within housing 13 of electronic device 11, electronic circuit EC receiving the necessary power from the battery source that is required to perform a particular function.

Electronic circuit EC is supplied power from either battery source through a battery circuit 111 within housing 13 of electronic device 11.

Figure 9:
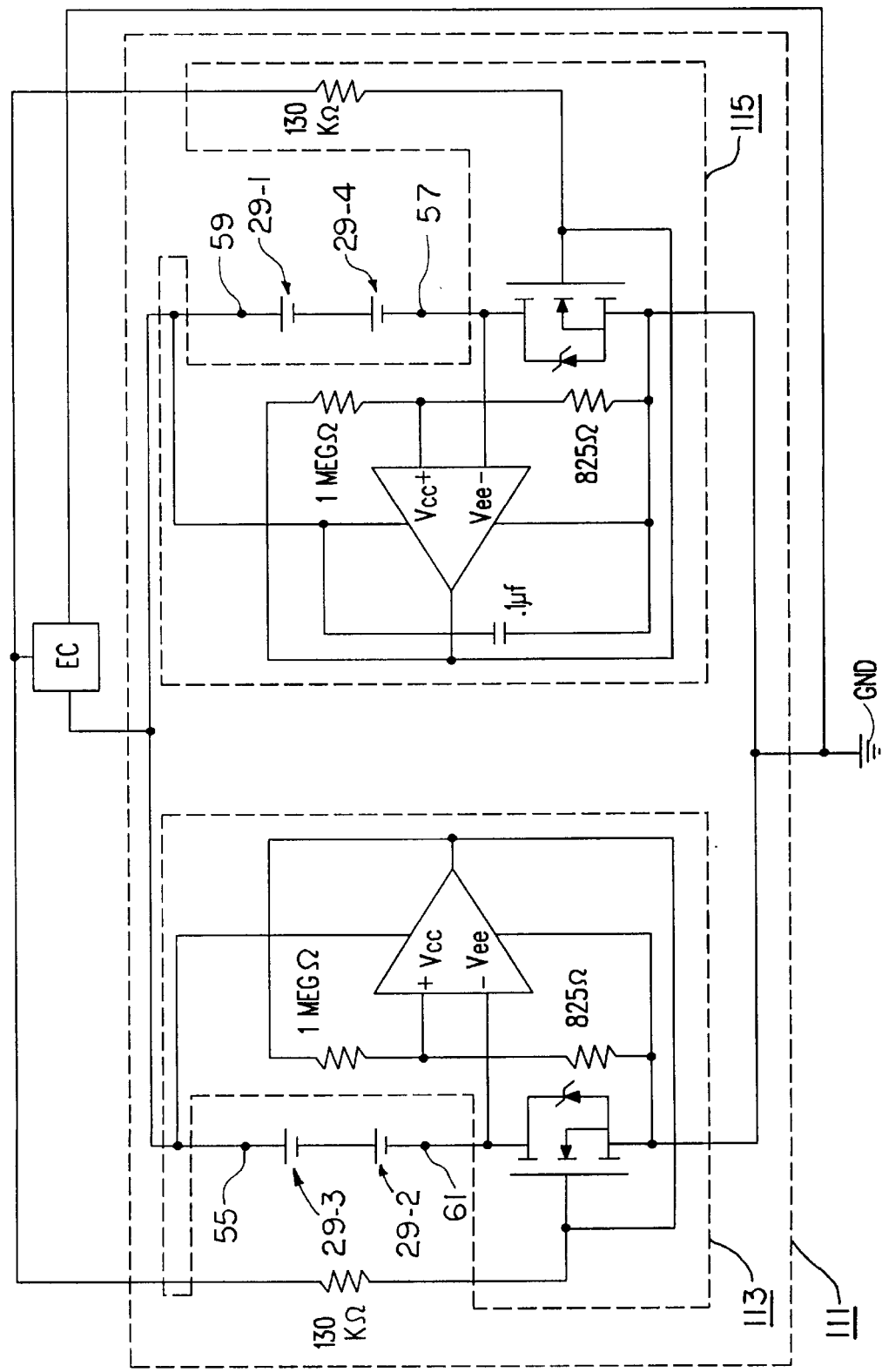
FIG. 9 is a schematic representation of the battery circuit of the electronic device of FIG. 1A, the battery circuit being shown with the four non-rechargeable batteries and the electronic circuit, the electronic circuit being shown in block diagram form.

Referring to FIG. 9, there is shown a schematic for battery circuit 111, battery circuit 111 being shown with four non-rechargeable batteries 29-1 through 29-4 installed within device 11 to power electronic circuit EC.

It should be particularly noted circuit 111 connects first spring contact 55 to first wire contact 59, such as by a shunt wire, and circuit 111 connects second spring contact 57 to second wire contact 61. Connected as such, circuit 111 configures second and third non-rechargeable batteries 29-2 and 29-3, which are in series with one another, in parallel with first and fourth non-rechargeable batteries 29-1 and 29-4, which are in series with one another. The parallel configuration ensures that electronic device 11 receives ample current to drive high power loads, as is desired.

Circuit 111 also includes first and second diode simulator circuits 113 and 115 which serve to prevent the cross-charging of batteries 29 with a relatively low forward voltage drop. First and second diode simulator circuits 113 and 115 are of the type described in U.S. Ser. No. 08/708, 152, filed on Aug. 29, 1996, which is hereby incorporated by reference.

Figure 10:
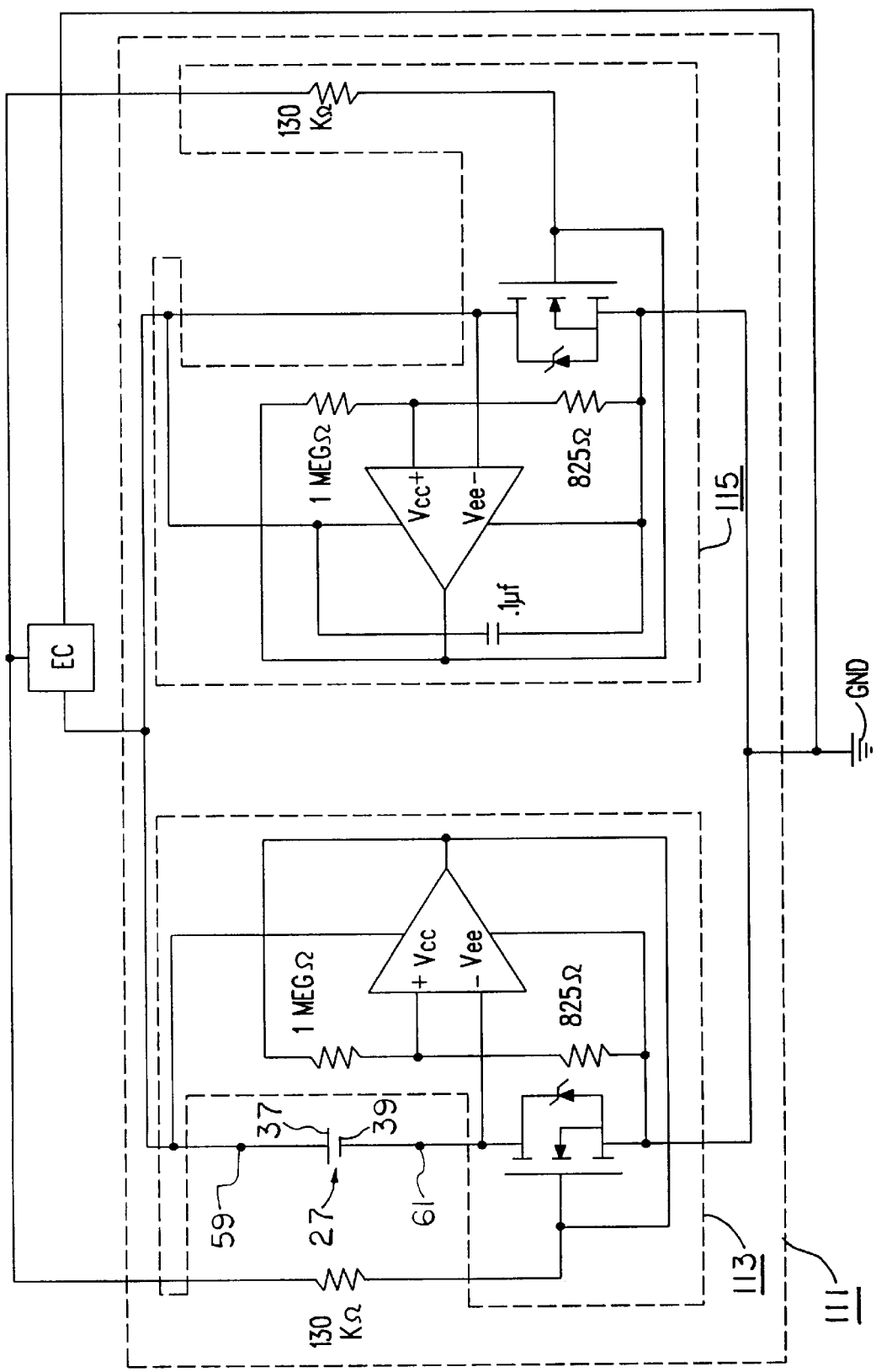
FIG. 10 is a schematic representation of the battery circuit of the electronic device of FIG. 1A, the battery circuit being shown with the single rechargeable battery and the electronic circuit, the electronic circuit being shown in block diagram form.

Referring now to FIG. 10, there is shown a schematic of circuit 111 with single rechargeable battery 27 shown installed in device 11 rather than non-rechargeable batteries 29 to power electronic circuit EC.

The embodiment shown in the present invention is intended to be merely exemplary and those skilled in the art shall be able to make numerous variations and modifications to it without departing from the spirit of the present invention. For example, alternate battery sources may be used to power the electronic device in place of the specific battery sources which were suggested above. Specifically, a rechargeable battery of the same general size, shape and voltage may be used in place of the 4.8 volt DURACELL battery model DR-121 disclosed above. In addition, a plurality of non-rechargeable batteries of the same general size, shape and voltage may be used in place of the four Hi-energy, size AA, ENERGIZER lithium batteries disclosed above. All such variations and modifications are intended to be within the scope of the present invention as defined in the appended claims.

What is claimed is:

1. An electronic device which is supplied power from a battery source, the battery source being either a rechargeable battery or a plurality of non-rechargeable batteries, the rechargeable battery having a first end and a second end, the first end having a positive terminal contact, a negative terminal contact, a pair of recharging contacts and a key, each of the plurality of non-rechargeable batteries including a first end having a positive terminal contact and a second end having a negative terminal contact, said electronic device comprising:

(a) a housing shaped to include a battery cavity which can accept either the rechargeable battery or the plurality of non-rechargeable batteries as the battery source for said electronic device, the battery cavity comprising a bottom wall, a front end wall, a back end wall and a pair of sidewalls, (b) one of the sidewalls of said battery cavity having a slot, said slot being sized and shaped to accept the key of the rechargeable battery to enable said battery cavity to accept the rechargeable battery as the battery source for said electronic device only when said rechargeable battery is inserted in said battery cavity with the first end of the rechargeable battery positioned towards the back end wall of said battery cavity, the second end of the rechargeable battery positioned toward the front end wall of said battery cavity and the key of the rechargeable battery facing down towards the bottom wall of said battery cavity, (c) an electronic circuit within said housing for enabling said electronic device to perform a particular operation, and (d) a battery circuit within said housing for supplying power from the battery source in said battery cavity to said electronic circuit.

2. The electronic device as claimed in claim 1 wherein, with the plurality of non-rechargeable batteries accepted within the battery cavity as the battery source for said electronic device, said battery circuit configures at least one of the non-rechargeable batteries in parallel with at least one other of the non-rechargeable batteries.

3. The electronic device as claimed in claim 2 further comprising first and second spring contacts on the front end wall of said battery cavity, said pair of spring contacts being sized and shaped and having a sufficient elasticity and spring force to maintain either the rechargeable battery or the plurality of non-rechargeable batteries as the battery source for said electronic device and in an operative electrical contact position within the battery cavity.

4. The electronic device as claimed in claim 3 further comprising first and second looped wire contacts mounted on the back end wall of said battery cavity, said first and second looped wire contacts being sized and shaped so as to maintain either the rechargeable battery or the plurality of non-rechargeable batteries as the battery source for said electronic device and in an operative electrical contact position within the battery cavity.

5. The electronic device as claimed in claim 4 wherein said first looped wire contact projects further out from the back end wall of said battery cavity than the second looped wire contact so as to maintain either the rechargeable battery or the plurality of non-rechargeable batteries as the battery source for said electronic device and in an operating electrical contact position within the battery cavity.

6. The electronic device as claimed in claim 5 wherein each of the pair of sidewalls in said battery cavity include an arcuately shaped lower portion, said slot being generally formed as a right angle in one of the pair of sidewalls to accept the key on the rechargeable battery in only its proper position with the first end of the rechargeable battery positioned towards the back end wall of said battery cavity, the second end of the rechargeable battery positioned toward the front end wall of said battery cavity and the key of the rechargeable battery facing down towards the bottom wall of the battery cavity.

7. The electronic device as claimed in claim 6 wherein the lower portion of each of the pair of sidewalls in said battery cavity includes a plurality of flexible fingers of a sufficient elasticity and spring force to securely maintain either the rechargeable battery or the plurality of non-rechargeable batteries in the battery cavity as the battery source for said electronic device and in an operative electrical contact position.

8. The electronic device as claimed in claim 7 wherein the bottom wall of the battery cavity includes a plurality of flexible tabs of a sufficient elasticity and spring force to securely maintain either the rechargeable battery or the plurality of non-rechargeable batteries in the battery cavity as the battery source for said electronic device and in an operative electrical contact position.

9. The electronic device as claimed in claim 8 further comprising a cover for enclosing said battery cavity, said cover having a pair of elongated ribs for securely maintaining either the rechargeable battery or the plurality of non-rechargeable batteries in the battery cavity as the battery source for said electronic device and in an operative electrical contact position.

10. The electronic device as claimed in claim 9 further comprising a pair of insulative support ramps for securely maintaining either the rechargeable battery or the plurality of non-rechargeable batteries in the battery cavity as the battery source for said electronic device and in an operative electrical contact position, each of said pair of support ramps being mounted on the back end wall of said battery cavity and having an elongated slot formed therewithin such that the first looped wire contact projects out through the slot of one support ramp and the second looped wire contact projects out through the slot of the other support ramp.

11. The electronic device as claimed in claim 10 further comprising a pair of recharging contacts in the battery cavity.

12. The electronic device as claimed in claim 11 wherein, with the rechargeable battery accepted within the battery cavity as the battery source for said electronic device, the pair of recharging contacts in the battery cavity are sized and shaped and are positioned within the battery cavity so as to contact the pair of recharging contacts on the rechargeable battery.

13. The electronic device as claimed in claim 12 wherein, with the plurality of non-rechargeable batteries accepted within the battery cavity as the battery source for said electronic device, the pair of recharging contacts in the battery cavity are sized and shaped and are positioned in the battery cavity so as to avoid drawing contact with the non-rechargeable batteries.

14. An electronic device which is supplied power from a battery source, the battery source being either a 4.8 volt rechargeable battery or four size AA non-rechargeable batteries, the rechargeable battery having a first end and a second end, the first end having a positive terminal contact, a negative terminal contact, a pair of recharging contacts and a key, each of the non-rechargeable batteries including a first end having a positive terminal contact and a second end having a negative terminal contact, said electronic device comprising:

(a) a housing shaped to include a battery cavity which can accept either the rechargeable battery or the four size AA non-rechargeable batteries is the battery source for said electronic device, the battery cavity comprising a bottom wall, a front end wall, a back end wall and a pair of sidewalls, (b) one of the sidewalls of said battery cavity having a slot, said slot being sized and shaped to accept the key of the rechargeable battery so as to enable said battery cavity to accept the rechargeable battery as the battery source for said electronic device only when said rechargeable battery is inserted in said battery cavity with the first end of the rechargeable battery positioned towards the back end wall of said battery cavity, the second end of the rechargeable battery positioned toward the front end wall of said battery cavity and the key of the rechargeable battery facing down towards the bottom wall of the battery cavity, (c) an electronic circuit within said housing for enabling said electronic device to perform a particular operation, and (d) a battery circuit within said housing for supplying power from the battery source in said battery cavity to said electronic circuit.

15. An electronic device which is supplied power from a battery source, the battery source being either a rechargeable battery such as a 4.8 volt rechargeable battery or a plurality of non-rechargeable batteries such as four size AA non-rechargeable batteries, the rechargeable battery having a first end and a second end, the first end having a positive terminal contact, a negative terminal contact, a pair of recharging contacts and a key, each of the plurality of non-rechargeable batteries including a first end having a positive terminal contact and a second end having a negative terminal contact, said electronic device comprising:

(a) a housing shaped to include a battery cavity which can accept either the rechargeable battery or the four size AA non-rechargeable batteries as the battery source for said electronic device, the battery cavity comprising a bottom wall, a front end wall, a back end wall and a pair of sidewalls, (b) one of the sidewalls of said battery cavity having a slot, said slot being sized and shaped to accept the key of the rechargeable battery to enable said battery cavity to accept the rechargeable battery as the battery source for said electronic device only when said rechargeable battery is inserted in said battery cavity with the first end of the rechargeable battery positioned towards the back end wall of said battery cavity, the second end of the rechargeable battery positioned toward the front end wall of said battery cavity and the key of the rechargeable battery facing down towards the bottom wall of the battery cavity, (c) an electronic circuit within said housing for enabling said electronic device to perform a particular operation, and (d) a battery circuit within said housing for supplying power from the battery source in said battery cavity to said electronic circuit.

* * * * *